US008250268B2

(12) United States Patent
Hu

(10) Patent No.: US 8,250,268 B2
(45) Date of Patent: Aug. 21, 2012

(54) DISPLAY DATA CHANNEL INTERFACE CIRCUIT

(75) Inventor: Ke-You Hu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 1042 days.

(21) Appl. No.: 12/192,094

(22) Filed: Aug. 14, 2008

(65) Prior Publication Data

US 2010/0007634 A1 Jan. 14, 2010

(30) Foreign Application Priority Data

Jul. 8, 2008 (CN) .......................... 2008 1 0302656

(51) Int. Cl.
*H04N 9/70* (2006.01)
*G06F 13/24* (2006.01)
*G06F 13/40* (2006.01)

(52) U.S. Cl. ........ 710/104; 710/305; 710/316; 348/643; 348/647

(58) Field of Classification Search .................. 710/104, 710/305, 316; 348/643, 647
See application file for complete search history.

(56) References Cited

U.S. PATENT DOCUMENTS

| | | | | | |
|---|---|---|---|---|---|
| 3,860,954 | A | * | 1/1975 | Tsuchiya | 348/507 |
| 3,975,759 | A | * | 8/1976 | Taniguchi et al. | 386/274 |
| 4,041,526 | A | * | 8/1977 | Kaneko | 386/301 |
| 4,092,667 | A | * | 5/1978 | Akazawa et al. | 348/644 |
| 4,253,108 | A | * | 2/1981 | Engel | 348/644 |
| 4,253,346 | A | * | 3/1981 | Kuhnle et al. | 477/155 |
| 4,785,346 | A | * | 11/1988 | Yoshimochi | 348/647 |
| 5,654,769 | A | * | 8/1997 | Ohara et al. | 348/644 |
| 5,948,091 | A | * | 9/1999 | Kerigan et al. | 710/10 |
| 7,334,054 | B2 | * | 2/2008 | Anderson | 710/15 |

* cited by examiner

*Primary Examiner* — Evan Pert
(74) *Attorney, Agent, or Firm* — Altis Law Group, Inc.

(57) ABSTRACT

A DDC interface circuit includes a first NMOS transistor and a second NMOS transistor. The gates of the first and the second NMOS transistors are all connected to a 3.3V system power via a first resistor. The source of the first NMOS transistor is connected to a DDC_CLK pin of a north bridge. The drain of the first NMOS transistor is connected to a 5V system power via a second resistor, and also connected to an SCL pin of a VGA interface via a third resistor to receive an ACK signal. The source of the second NMOS transistor is connected to a DDC_DATA pin of the north bridge. The drain of the second NMOS transistor is connected to the 5V system power via a fourth resistor, and also connected to an SDA pin of the VGA interface via a fifth resistor.

9 Claims, 1 Drawing Sheet

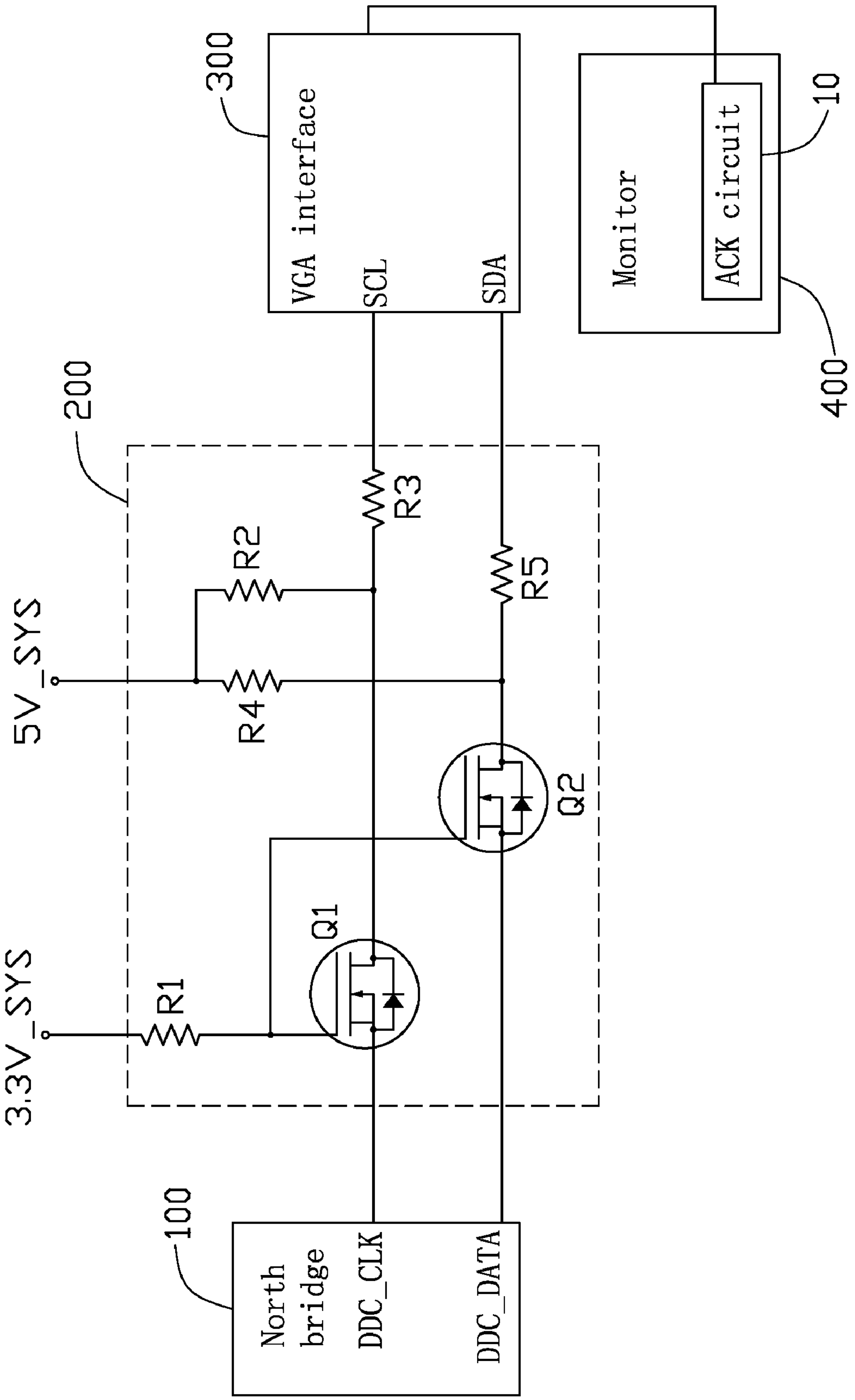
300
VGA interface
SCL
SDA
10
ACK circuit
Monitor
400
200
5V_SYS
R2
R3
R4
R5
Q2
Q1
3.3V_SYS
R1
100
North bridge
DDC_CLK
DDC_DATA

DISPLAY DATA CHANNEL INTERFACE CIRCUIT

BACKGROUND

1. Field of the Invention

The present invention relates to interface circuits and, particularly, to a display data channel (DDC) interface circuit on a motherboard.

2. Description of the Related Art

DDC is a standard communications channel between a computer and a monitor. A monitor contains a read-only memory (ROM) chip programmed by the manufacturer with information about the graphics modes that the monitor can display. The data in the monitor's ROM is held in a standard format called extended display identification data (EDID). The EDID is a data structure provided by the monitor to describe its capabilities for a graphics card of the computer. With this information, the computer knows what kind of monitor it is connected to. The EDID is defined by the video electronics standards association (VESA). The EDID includes manufacturer name, product type, phosphor or filter type, timings supported by the monitor, monitor size, luminance data and (for digital displays only) pixel mapping data. The EDID information is communicated to the computer over the DDC. The EDID and the DDC enable the computer and the monitor to communicate so that the computer can be configured to support specific features available in the monitor. However, the computer often cannot obtain the EDID because the computer cannot recognize an automatic color killer (ACK) signal output from the monitor.

What is needed, therefore, is a DDC interface circuit which can overcome the above problem.

BRIEF DESCRIPTION OF THE DRAWING

The FIGURE is a circuit diagram of an embodiment of a DDC interface circuit on a motherboard in accordance with the present invention.

DETAILED DESCRIPTION

Referring to the FIGURE, a DDC interface circuit 200 on a motherboard in accordance with an embodiment of the present invention includes two N type metal oxide semiconductor (NMOS) transistors Q1 and Q2, and five resistors R1, R2, R3, R4, and R5.

The gate of the NMOS transistor Q1 is arranged to receive a system power 3.3V_SYS via the resistor R1. The source of the NMOS transistor Q1 is connected to a display data channel clock (DDC_CLK) pin of a north bridge 100 on the motherboard. The drain of the NMOS transistor Q1 is arranged to receive a system power 5V_SYS via the resistor R2, and also connected to a serial clock (SCL) pin of a video graphics array (VGA) interface 300 on the motherboard via the resistor R3. The gate of the NMOS transistor Q2 is arranged to receive the system power 3.3V_SYS via the resistor R1. The source of the NMOS transistor Q2 is connected to a display data channel data (DDC_DATA) pin of the north bridge 100. The drain of the NMOS transistor Q2 is arranged to receive the system power 5V_SYS via the resistor R4, and also connected to a serial data (SDA) pin of the VGA interface 300 via the resistor R5. The VGA interface 300 is also connected to an automatic color killer (ACK) 10 in a monitor 400 to receive an ACK signal and transmit the ACK signal to the DDC interface circuit 200.

In the present embodiment, the system power 3.3V_SYS is provided for the gates of the NMOS transistors Q1 and Q2 via the resistor R1, such that the NMOS transistors Q1 and Q2 are turned on. The system power 5V_SYS is provided for the drains of the NMOS transistors Q1 and Q2 via the resistors R2 and R4 respectively. The resistances of the resistors R2 and R4 are all between 9.5 kΩ-10.5 kΩ. The ACK signal output from the ACK circuit 10 in the monitor 400 is transmitted to the north bridge 100 via the VGA interface 300 and the DDC interface circuit 200. The north bridge 100 recognizes the ACK signal at a valid low level and then transmits a read instruction to the monitor 400 via the DDC interface circuit 200 and the VGA interface 300. The monitor 400 transmits an extended display identification data (EDID) to the DDC_DATA pin of the north bridge 100 via the VGA interface 300 and the DDC interface 200. Thereby the north bridge 100 controls the monitor 400 to display accurately according to the EDID. The VGA interface 300 is configured for converting a digital signal from the north bridge 100 to an analog signal to the monitor 400, and vice versa.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A display data channel (DDC) interface circuit, comprising:

- a first N type metal oxide semiconductor (NMOS) transistor comprising:
  - a gate arranged to receive a 3.3V system power via a first resistor;
  - a source connected to a display data channel clock pin DDC_CLK of a north bridge on a motherboard; and
  - a drain arranged to receive a 5V system power via a second resistor, and also connected to a serial clock pin SCL of a video graphics array (VGA) interface on the motherboard via a third resistor, the VGA interface also connected to an automatic color killer (ACK) in a monitor to receive an ACK signal; and
- a second NMOS transistor comprising:
  - a gate arranged to receive the 3.3V system power via the first resistor;
  - a source connected to a display data channel data pin DDC_DATA of the north bridge; and
  - a drain arranged to receive the 5V system power via a fourth resistor, and also connected to a serial data pin SDA of the VGA interface via a fifth resistor to receive the ACK signal.

2. The DDC interface circuit as claimed in claim 1, wherein the resistance of the second resistor is between 9.5 kΩ and 10.5 kΩ.

3. The DDC interface circuit as claimed in claim 1, wherein the resistance of the fourth resistor is between 9.5 kΩ and 10.5 kΩ.

4. A display data channel (DDC) interface circuit, comprising:

- a first electronic switch connected between a display data channel clock pin DDC_CLK of a north bridge on a motherboard and a serial clock pin SCL of a video graphics array (VGA) interface on the motherboard, the VGA interface also connected to an automatic color killer (ACK) in a monitor to receive an ACK signal, and the first electronic switch turned on by a power supply; and a second electronic switch connected between a display data channel data pin DDC_DATA of the north bridge and a serial data pin SDA of the VGA interface to receive the ACK signal, and the second electronic switch turned on by the power supply;

wherein the DDC interface circuit is capable of making the ACK signal valid at a low level.

5. The DDC interface circuit as claimed in claim 4, wherein the power supply comprises a 3.3V system power and a 5V system power.

6. The DDC interface circuit as claimed in claim 5, wherein the first electronic switch is a first NMOS transistor comprising:

a gate arranged to receive the 3.3V system power via a first resistor;

a source connected to the DDC_CLK pin of the north bridge; and a drain arranged to receive the 5V system power via a second resistor, and also connected to the SCL pin of the VGA interface via a third resistor.

7. The DDC interface circuit as claimed in claim 6, wherein the second electronic switch is a second NMOS transistor comprising:

a gate arranged to receive the 3.3V system power via the first resistor;

a source connected to the DDC_DATA pin of the north bridge; and a drain arranged to receive the 5V system power via a fourth resistor, and also connected to an SDA pin of the VGA interface via a fifth resistor.

8. The DDC interface circuit as claimed in claim 6, wherein the resistance of the second resistor is between 9.5 kΩ and 10.5 kΩ.

9. The DDC interface circuit as claimed in claim 7, wherein the resistance of the fourth resistor is between 9.5 kΩ and 10.5 kΩ.

* * * * *